United States Patent
Miura

(10) Patent No.: US 9,327,908 B2
(45) Date of Patent: May 3, 2016

(54) CONVEYING APPARATUS
(71) Applicant: MIURA CO., LTD, Saitama (JP)
(72) Inventor: Takao Miura, Saitama (JP)
(73) Assignee: MIURA CO., LTD., Saitama (JP)
( * ) Notice: Subject to any disclaimer, the term of this patent is extended or adjusted under 35 U.S.C. 154(b) by 0 days.
(21) Appl. No.: 14/455,108
(22) Filed: Aug. 8, 2014
(65) Prior Publication Data
US 2015/0041286 A1 Feb. 12, 2015
(30) Foreign Application Priority Data Aug. 9, 2013 (JP) ................................. 2013-166750

(51) Int. Cl.
*B65G 25/04* (2006.01)
*B65G 25/02* (2006.01)
*F15B 15/14* (2006.01)
(52) U.S. Cl.
CPC ................ *B65G 25/02* (2013.01); *B65G 25/04* (2013.01); *F15B 15/14* (2013.01)
(58) Field of Classification Search
CPC ...... B65G 25/02; B65G 25/065; B65G 25/06; B65G 25/04; F15B 15/14; F15B 15/00
USPC ................... 198/750.5, 750.2, 750.14
See application file for complete search history.

(56) References Cited

U.S. PATENT DOCUMENTS

| | | | | |
|---|---|---|---|---|
| 2,550,925 A | | 5/1951 | Weimar | |
| 3,838,769 A | * | 10/1974 | Fishburne | B65G 25/02 198/750.7 |
| 3,994,539 A | * | 11/1976 | Gottlieb | F15B 15/1414 384/49 |
| 4,219,113 A | * | 8/1980 | Fieser | B65G 25/02 198/414 |
| 4,511,029 A | * | 4/1985 | Okawa | B65G 25/02 198/621.2 |
| 4,709,805 A | * | 12/1987 | Foster | B65G 25/065 198/750.5 |
| 4,793,468 A | * | 12/1988 | Hamilton | B65G 25/065 198/750.5 |
| 4,793,469 A | * | 12/1988 | Foster | B65G 25/065 198/750.5 |
| 4,962,848 A | * | 10/1990 | Foster | B65G 25/065 198/750.2 |
| 4,969,387 A | * | 11/1990 | Foster | B65G 25/065 91/176 |
| 4,969,389 A | * | 11/1990 | Foster | B65G 25/065 92/117 R |
| 5,014,602 A | | 5/1991 | Iwata | |
| 5,165,524 A | * | 11/1992 | Foster | B65G 25/065 198/750.4 |
| 5,193,661 A | * | 3/1993 | Foster | B65G 25/065 198/750.5 |
| 5,203,445 A | * | 4/1993 | Shiraiwa | H01L 21/67781 198/346.1 |

(Continued)

FOREIGN PATENT DOCUMENTS

DE 202005003031 U1 7/2006
JP S56-14883 A 2/1981

(Continued)

*Primary Examiner* — Gene Crawford
*Assistant Examiner* — Thomas Randazzo
(74) *Attorney, Agent, or Firm* — Rabin & Berdo, P.C.

(57) ABSTRACT

Hydraulic cylinders of a conveying apparatus includes piston rods that extend in parallel, pistons, and cylinder tubes that have an internal pressure chamber partitioned into first and second pressure chambers. A pair of the hydraulic cylinders are arranged in parallel with an interval in a width direction of a conveyance path. The cylinder tube slidingly moves to the first pressure chamber side by supplying a hydraulic pressure to the first pressure chamber and discharging a hydraulic pressure from the second pressure chamber, and the cylinder tubes slidingly move to the second pressure chamber side by supplying a hydraulic pressure to the second pressure chamber and discharging a hydraulic pressure from the first pressure chamber. The workpiece is supported by a pair of the cylinder tubes.

6 Claims, 10 Drawing Sheets

(56) References Cited

U.S. PATENT DOCUMENTS

| | | | | |
|---|---|---|---|---|
| 5,228,555 | A | * | 7/1993 | Hallstrom ............ B65G 25/065 198/750.5 |
| 5,263,402 | A | * | 11/1993 | Gottlieb ................. B23Q 1/267 91/167 R |
| 5,402,878 | A | * | 4/1995 | Lutz ..................... B65G 25/065 198/750.6 |
| 5,427,229 | A | * | 6/1995 | Foster .................. B65G 25/065 198/750.7 |
| 5,839,568 | A | * | 11/1998 | Clark ................... B65G 25/065 198/750.5 |
| 5,860,508 | A | * | 1/1999 | Foster .................. B65G 25/065 198/750.1 |
| 6,129,003 | A | | 10/2000 | Udagawa |
| 6,439,375 | B1 | * | 8/2002 | Foster .................... B65G 25/04 198/775 |
| 7,661,523 | B2 | * | 2/2010 | Wegkamp ............ B65G 25/065 198/750.2 |
| 7,975,836 | B2 | * | 7/2011 | Von Seggern .......... B65G 25/04 198/750.14 |
| 2011/0056805 | A1 | * | 3/2011 | Schmidt et al. ...... B65G 25/065 198/750.5 |

FOREIGN PATENT DOCUMENTS

| | | |
|---|---|---|
| JP | S62-185905 U | 11/1987 |
| JP | H09-142629 A | 6/1997 |

* cited by examiner

CONVEYING APPARATUS

TECHNICAL FIELD

The present invention relates to a conveying apparatus.

BACKGROUND ART

Medicines or foods are manufactured inside a clean room having high air cleanliness in order to avoid a foreign object from being mixed. When a typical conveying apparatus such as a conveyor belt is employed inside the clean room, the air cleanliness is degraded due to dust generation.

JP9-142629A discloses a conveying apparatus designed for using in a clean room. This conveying apparatus is a belt conveyor, in which a loop-like belt is stretched between a plurality of rollers, and the belt is driven by rotating the rollers using a motor. A load is placed on the belt of the upper surface and is conveyed horizontally.

SUMMARY OF INVENTION

In the technique of the related art described above, dust such as abrasive debris may be generated from a sliding movement portion such as the motor and the roller, or this dust may leak together with a lubricant. Therefore, it is difficult to maintain high air cleanliness inside the clean room.

It is an object of the present invention to provide a conveying apparatus capable of suppressing generation of dust.

According to one aspect of the present invention, a conveying apparatus having hydraulic cylinders that horizontally convey a workpiece along a conveyance path is provided. A pair of the hydraulic cylinders are arranged in parallel with an interval in a width direction of the conveyance path. The hydraulic cylinders have piston rods that extend in parallel along the conveyance path and are fixed in an axial direction, pistons connected to the piston rods, and cylinder tubes that house the pistons in a slidable manner and have an internal pressure chamber partitioned by the pistons into first and second pressure chambers. The cylinder tubes slidingly move to the first pressure chamber side by supplying a hydraulic pressure to the first pressure chamber and discharging a hydraulic pressure from the second pressure chamber. The cylinder tubes slidingly move to the second pressure chamber side by supplying a hydraulic pressure to the second pressure chamber and discharging a hydraulic pressure from the first pressure chamber. The workpiece is supported by a pair of the cylinder tubes.

DESCRIPTION OF EMBODIMENTS

A description will now be made for embodiments of this disclosure with reference to the accompanying drawings.

Figure 1:
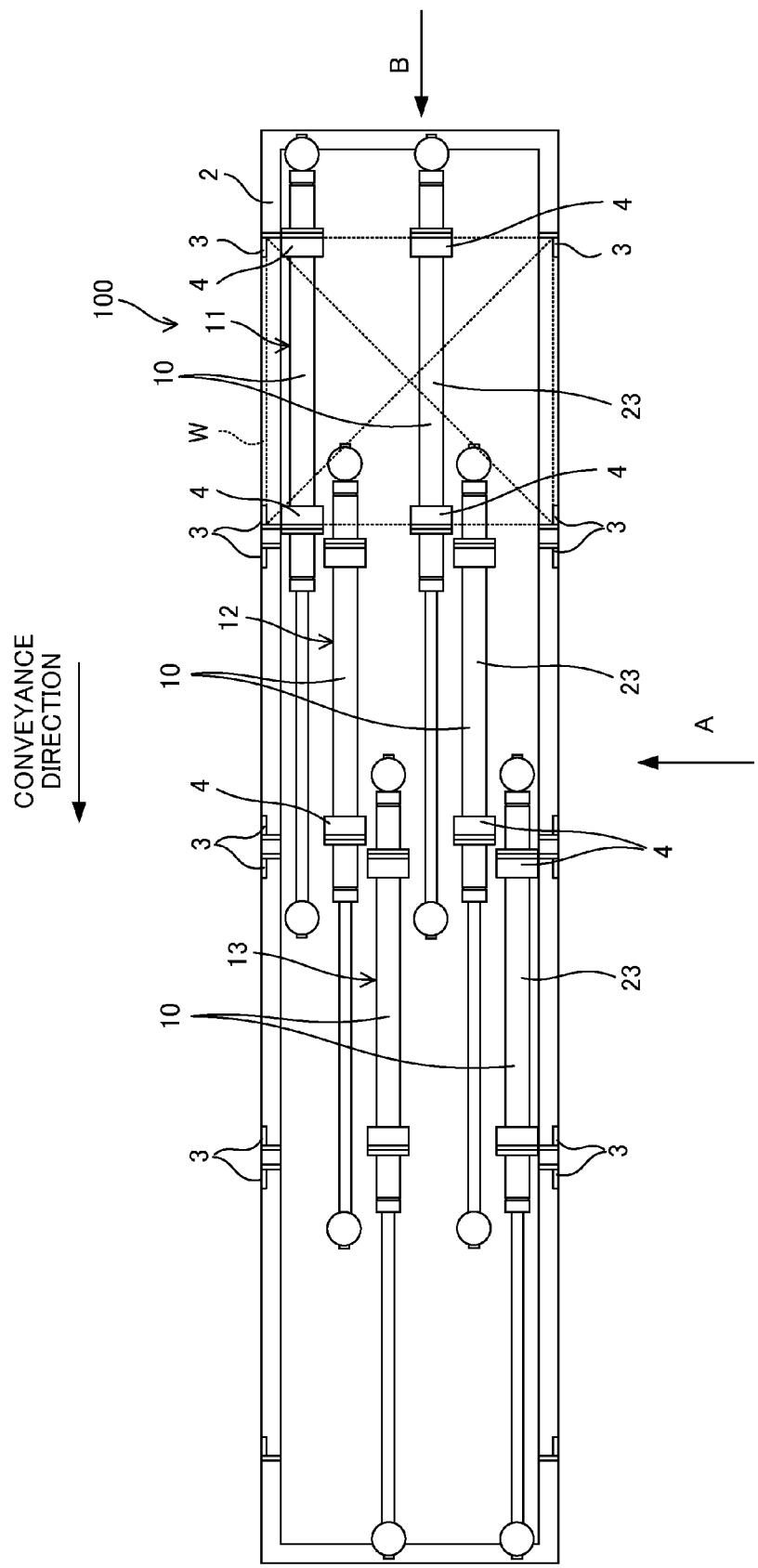
FIG. 1 is a top plan view illustrating a conveying apparatus according to an embodiment of this disclosure.
Figure 2:
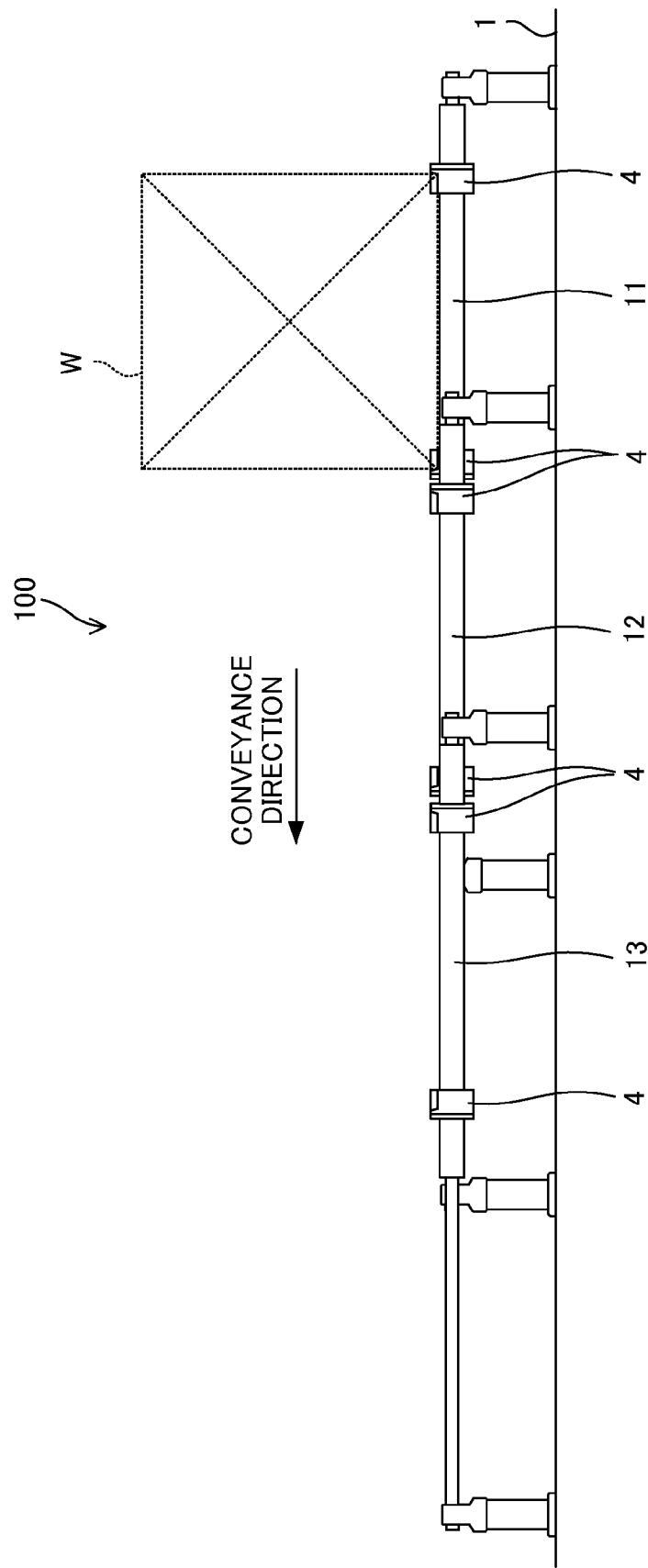
FIG. 2 is a side view illustrating the conveying apparatus of FIG. 1 as seen from an arrow direction A.
Figure 3:
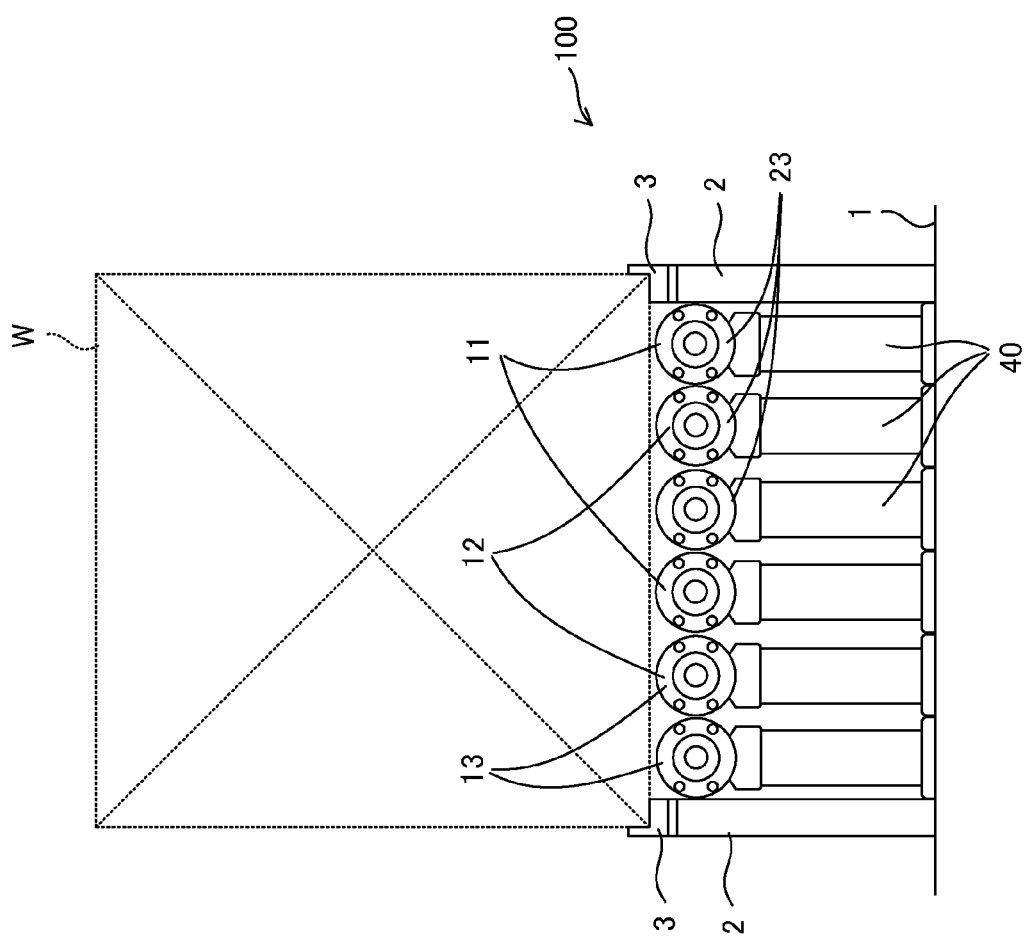
FIG. 3 is a side view illustrating the conveying apparatus of FIG. 1 as seen from an arrow direction B.

FIG. 1 is a top plan view illustrating a conveying apparatus 100 according to an embodiment of this disclosure. FIG. 2 is a side view illustrating the conveying apparatus 100 of FIG. 1 as seen from an arrow direction A. FIG. 3 is a side view illustrating the conveying apparatus 100 of FIG. 1 as seen from an arrow direction B. It is noted that a frame 2 is not illustrated in FIG. 2 intentionally for clear description purposes.

The conveying apparatus 100 is an apparatus for conveying a source material or the like in a clean room, where high air cleanliness is necessary, of a factory for manufacturing medicines, foods, and the like. The conveyed source material is approximately horizontally shifted inside a clean room while it is contained in a container or the like. In the following description, this container and the like will be referred to as a "workpiece W."

Referring to FIG. 1, the conveying apparatus 100 includes a rectangular frame 2 fixed to a floor surface 1 of the clean room and three pairs of hydraulic cylinders 10 disposed in a paired manner along a longitudinal direction of the frame 2 inside the frame 2.

The frame 2 is arranged such that its longitudinal direction is oriented to a conveyance direction of the workpiece W. The frame 2 has L-shaped guide members 3 that make contact with four corners of the placed workpiece W and are provided on the top surface with a predetermined interval to prevent a deviation of the workpiece W.

Three pairs of hydraulic cylinders 10 include a first cylinder pair 11, a second cylinder pair 12, and a third cylinder pair 13. Each cylinder pair 11, 12, and 13 has a pair of hydraulic cylinders 10 and is provided in parallel continuously along the conveyance path.

The first and second cylinder pairs 11 and 12 are arranged in an overlapping manner with an interval corresponding to a maximum stroke of a cylinder tube 23 described below such that they are deviated from each other in a width direction of the conveyance path to prevent interference with each other. Similarly, the second and third cylinder pairs 12 and 13 are arranged in an overlapping manner with an interval corresponding to a maximum stroke of the cylinder tube 23 such that they are deviated from each other in a width direction of the conveyance path to prevent interference with each other.

That is, a total of six hydraulic cylinders 10 are arranged inside the frame 2 such that they are paired along a conveying direction and are deviated from each other in the width direction of the conveyance path.

Figure 4:
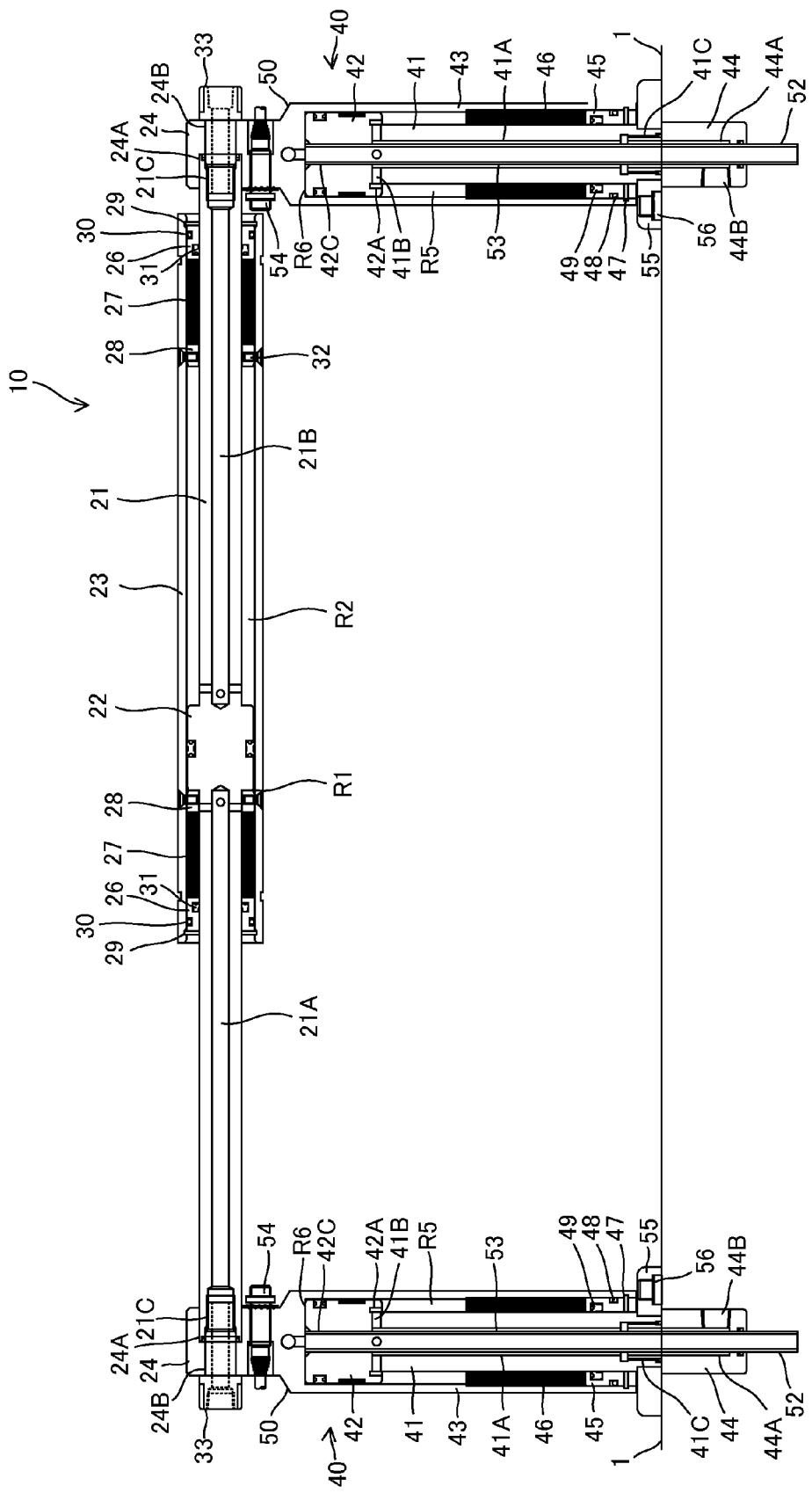
FIG. 4 is a cross-sectional view illustrating a hydraulic cylinder.

Here, a description will be made for a single hydraulic cylinder 10. FIG. 4 is a cross-sectional view illustrating the hydraulic cylinder 10.

The hydraulic cylinder 10 is a double rod type. The hydraulic cylinder 10 includes: a piston rod 21 arranged in parallel along the conveyance path, a piston 22 integratedly connected to the piston rod 21; and a cylinder tube 23 that houses the piston 22 in a slidable manner and has an internal pressure chamber partitioned by the piston 22 into first and second pressure chambers R1 and R2.

The piston rod 21 is a columnar member that has both ends supported by a support portion 24 and is fixed in an axis direction. The piston 22 is a columnar portion having a diameter larger than that of the piston rod 21 and is integratedly connected to the center of the piston rod 21. The cylinder tube 23 is a cylindrical member that is provided in an outer circumference of the piston rod 21 to cover the piston rod 21 and has an inner circumference making sliding contact with the outer circumference of the piston 22.

In both ends of the cylinder tube 23, a seal casing 26, a busing 27, and a bushing presser 28 are fitted sequentially in this order from each end side. The seal casing 26 is fixed by a snap ring 29 and has an outer circumference that abuts on the inner circumference of the cylinder tube 23 and is sealed with an O-ring 30 and an inner circumference that abuts on the outer circumference of the piston rod 21 and is sealed with a rod packing 31. The bushing presser 28 is fixed to the cylinder tube 23 using a countersunk screw 32 to hold the bushing 27 between the bushing presser 28 and the seal casing 26.

As a result, a space is defined between the bushing pressers 28 in both ends of the cylinder tube 23. This space is partitioned by the piston 22 into first and second chambers R1 and R2. Since the piston 22 is integratedly connected to the piston rod 21, and the piston rod 21 is fixed to the support portion 24 as described above, the piston 22 and the piston rod 21 do not move in an axial direction. Instead, the cylinder tube 23 moves in a sliding manner along an axial direction according to a pressure difference between the first and second pressure chambers R1 and R2.

The piston rod 21 has a first communication hole 21A that is bored in an axial direction from one end to the vicinity of the first pressure chamber R1 and extends in a radial direction from a leading end to communicate with the first pressure chamber R1, and a second communication hole 21B that is bored in an axial direction from the other end to the vicinity of the second pressure chamber R2 and extends in a radial direction from the leading end to communicate with the second pressure chamber R2. Threads 21C to which a head plug 33 described below is fastened are formed in both ends of the piston rod 21, that is, inner circumferences of the outlets of the first and second communication holes 21A and 21B.

Each of the support portions 24 arranged in both ends of the piston rod 21 to support the piston rod 21 is formed in a head 50 of a single rod type lift cylinder 40.

The single rod type lift cylinder 40 includes: a lift rod 41 provided perpendicularly to the floor surface 1; a lift piston 42 integratedly connected to the upper end of the lift rod 41; and a lift tube 43 that houses the lift piston 42 in a slidable manner and has an inner pressure chamber partitioned by the lift piston 42 into lower and upper pressure chambers R5 and R6.

The lift rod 41 is a columnar member extending upwardly and vertically from a top surface of a bottom plug 44 buried in the floor surface 1. The lift rod 41 includes: a core hole 41A perforating from a lower end to an upper end of an axial direction; and a communication hole 41B formed on a top portion of the lift rod 41 in a radial direction such that internal and external sides of the lift rod 41 communicate with each other.

The bottom plug 44 is fastened to the thread 41C formed in the core hole 41A so that it is closely fixed to the lift rod 41. The bottom plug 44 is formed in a cylindrical shape having a core hole 44A formed coaxially with the core hole 41A of the lift rod 41 and has a through-hole 44B perforating through the cylindrical portion in a radial direction.

The lift piston 42 is a columnar portion having a diameter larger than that of the lift rod 41 and is integratedly connected to a top portion of the lift rod 41. The lift piston 42 includes, sequentially from the lower side, a large diameter portion 42A that has an inner diameter larger than an outer diameter of the lift rod 41 and faces the communication hole 41B of the lift rod 41, and a reduced diameter portion 42C that is arranged over the large diameter portion 42A and has an inner diameter smaller than that of the large diameter portion 42A.

The lift tube 43 is a cylindrical member that is provided in an outer circumference of the lift rod 41 to cover the lift rod 41 and has an inner circumference making sliding contact with the outer circumference of the lift piston 42.

The lift casing 45 and the lift bushing 46 are fitted to a lower end portion of the lift tube 43 sequentially in this order from the end side. The lift casing 45 is fixed using a snap ring 47 and has an outer circumference that makes close contact with the inner circumference of the lift tube 43 and is sealed with an O-ring 48 and an inner circumference that makes close contact with the outer circumference of the lift rod 41 and is sealed with a rod packing 49.

A columnar head 50 is connected to the upper end of the lift tube 43 to block the upper end of the lift tube 43.

As a result, a space is defined between the lift bushing 46 of the lift tube 43 and the head 50. This space is partitioned by the lift piston 42 into lower and upper pressure chambers R5 and R6. Since the lift piston 42 is integratedly connected to the lift rod 41, and the lift rod 41 is fixed to the floor surface 1 as described above, the lift piston 42 and the lift rod 41 do not move vertically. Instead, the lift tube 43 vertically moves in a sliding manner depending on a pressure difference between the lower and upper pressure chambers R5 and R6.

A feeding pipe 52 is inserted into the core holes 41A of the bottom plug 44 and the lift rod 41. The feeding pipe 52 has an upper end fitted to the reduced diameter portion 42C and the other end extending to the lower end of the bottom plug 44. The diameter of the feeding pipe 52 is set to be smaller than the inner diameter of the core holes 41A of the lift rod 41 and the bottom plug 44. As a result, an annular passage 53 is formed inside the core holes 41A in the circumferential side outer than the feeding pipe 52.

Meanwhile, a support portion 24 that supports the piston rod 21 is formed over the head 50. The support portion 24 includes an insert portion 24A which is formed horizontally and where an end of the piston rod 21 is inserted, and a through-hole 24B formed coaxially with the first and second communication holes 21A and 21B of the piston rod 21 inserted into the insert portion 24A.

The piston rod 21 is fixed to the support portion 24 in a screw manner by fastening the head plug 33 inserted from the side opposite to the piston rod 21 of the support portion 24 while it is inserted into the insert portion 24A. The head plug 33 has a core hole coaxially formed with the first and second communication holes 21A and 21B of the piston rod 21.

A description will now be made for the operation of the hydraulic cylinder 10.

If a hydraulic pressure supplied from a hydraulic pump (not illustrated) is supplied to the first pressure chamber R1 through the head plug 33 and the first communication hole 21A, and a hydraulic pressure of the second pressure chamber R2 is discharged through the second communication hole 21B and the head plug 33, the first pressure chamber R1 expands, and the second pressure chamber R2 contracts. As a result, the cylinder tube 23 slidingly moves to the first pressure chamber R1 side (to one end side of the piston rod 21) so that the second pressure chamber R2 side of the piston 22 abuts on the bushing presser 28.

On the contrary, if the hydraulic pressure supplied from the hydraulic pump (not illustrated) is supplied to the second pressure chamber R2 through the head plug 33 and the second communication hole 21B, and the hydraulic pressure of first pressure chamber R1 is discharged through the first communication hole 21A and the head plug 33, the second pressure chamber R2 expands, and the first pressure chamber R1 contracts. As a result, the cylinder tube 23 slidingly moves to the second pressure chamber R2 side (to the other end side of the piston rod 21) so that the first pressure chamber R1 side of the piston 22 abuts on the bushing presser 28.

In this manner, the cylinder tube 23 can move slidingly along the piston rod 21 in an axial direction by supplying/discharging the hydraulic pressure to/from the first and second pressure chambers R1 and R2. It is noted that the maximum stroke of the cylinder tube 23 is set as a distance from a state that the cylinder tube 23 stays in the end of the first pressure chamber R1 side to a state that the cylinder tube 23 stays in the end of the second pressure chamber R2 side.

A description will now be made for the operation of the lift cylinder 40.

If a hydraulic pressure supplied from a hydraulic pump (not illustrated) is supplied to the upper pressure chamber R6 through the feeding pipe 52, and a hydraulic pressure of the lower pressure chamber R5 is discharged through the communication hole 41B, the annular passage 53, and the through-hole 44B, the upper pressure chamber R6 expands, and the lower pressure chamber R5 contracts. As a result, the lift tube 43 moves slidingly to the upper pressure chamber R6 side (to the upper end side of the lift rod 41), and the lower pressure chamber R5 side of the lift piston 42 abuts on the lift bushing 46.

On the contrary, if the hydraulic pressure supplied from the hydraulic pump (not illustrated) is supplied to the lower pressure chamber R5 through the through-hole 44B, the annular passage 53, and the communication hole 41B, and the hydraulic pressure of the upper pressure chamber R6 is discharged through the feeding pipe 52, the lower pressure chamber R5 expands, and the upper pressure chamber R6 contracts. As a result, the lift tube 43 moves slidingly to the lower pressure chamber R5 side (to the lower end side of the lift rod 41), and the upper pressure chamber R6 side of the lift piston 42 abuts on the head 50.

In this manner, the hydraulic cylinder 10 extends horizontally between the heads 50 of a pair of lift cylinders 40 arranged vertically so that it is lifted or lowered depending on expansion/contraction of a pair of lift cylinders 40.

As illustrated in FIGS. 1 to 3, four abutting portions 4 abutting on the bottom surface of the workpiece W are provided with a predetermined interval in the outer circumference of each cylinder tube 23. The predetermined interval is set to be approximately equal to a dimension of the workpiece W in the conveying direction.

As illustrated in FIG. 2, the abutting portion 4 arranged in the upstream side of the workpiece W conveying direction is formed to have a protuberating front side, and the abutting portion 4 arranged in the downstream side of the workpiece W conveying direction is formed to have a protuberating rear side. As a result, it is possible to prevent the workpiece W from slipping down from the abutting portion 4 when the cylinder tube 23 moves slidingly while the workpiece W is placed.

As illustrated in FIG. 3, when the lift cylinder 40 contracts, the workpiece W is placed on the frame 2 so that a deviation in the horizontal direction is prevented by the guide member 3. In order to convey the workpiece W, the first cylinder pair 11 is lifted to lift the workpiece W from the frame 2 using a pair of cylinder tubes 23, and the workpiece W is conveyed in a conveying direction by slidingly moving the cylinder tube 23. Then, the workpiece W is placed on the frame 2 again by lowering a pair of cylinder tubes 23.

Here, a process of conveying the workpiece W will be described with reference to FIGS. 5A to 5F. FIGS. 5A to 5F are plan views illustrating the conveying apparatus 100 as seen in an arrow direction A of FIG. 1, in which the frame 2 is omitted intentionally for simplicity purposes.

Figure 5A:
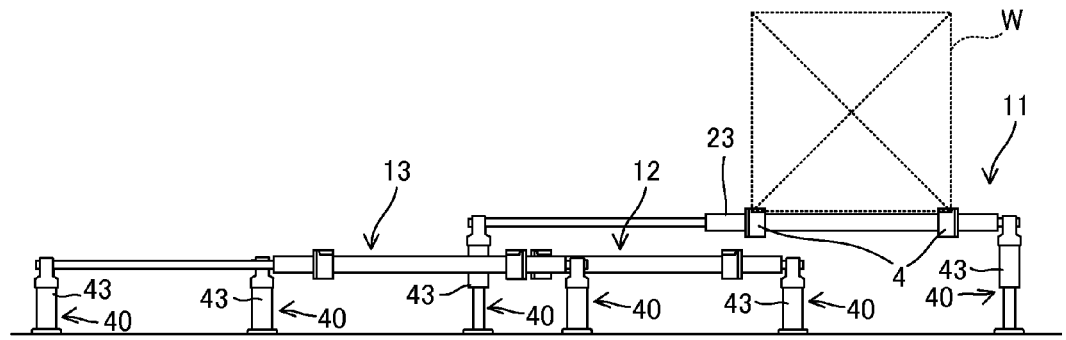
FIG. 5A is a diagram for describing the operation of the conveying apparatus.

If a hydraulic pressure is supplied to the upper pressure chamber R6 of the lift cylinder 40 of the first cylinder pair 11, and a hydraulic pressure is discharged from the lower pressure chamber R5, the lift tube 43 is lifted, and the workpiece W placed on the cylinder tube 23 is lifted together (FIG. 5A). As a result, the hydraulic cylinder 10 of the first cylinder pair 11 is held in a position higher than the hydraulic cylinders 10 of the second and third cylinder pairs 12 and 13.

Figure 5B:
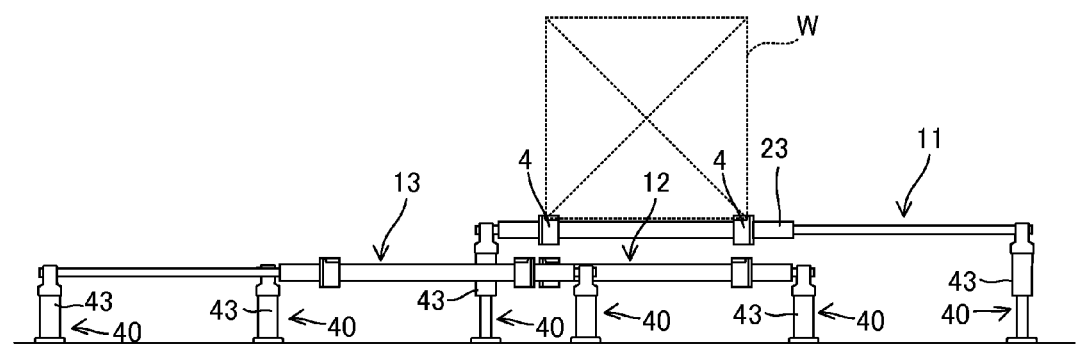
FIG. 5B is a diagram for describing the operation of the conveying apparatus.

If a hydraulic pressure is supplied to the first pressure chamber R1 of the hydraulic cylinder 10 of the first cylinder pair 11, and a hydraulic pressure is discharged from the second pressure chamber R2, the cylinder tube 23 slidingly moves in the conveying direction, and the workpiece W moves in the conveying direction along with the cylinder tube 23 (FIG. 5B).

As the cylinder tube 23 of the hydraulic cylinder 10 of the first cylinder pair 11 slidingly moves to the stroke end, a hydraulic pressure is supplied to the lower pressure chamber R5 of the lift cylinder 40, and a hydraulic pressure is discharged from the upper pressure chamber R6. As a result, the lift tube 43 of the first cylinder pair 11 is lowered, and the workpiece W is placed on the frame 2.

Figure 5C:
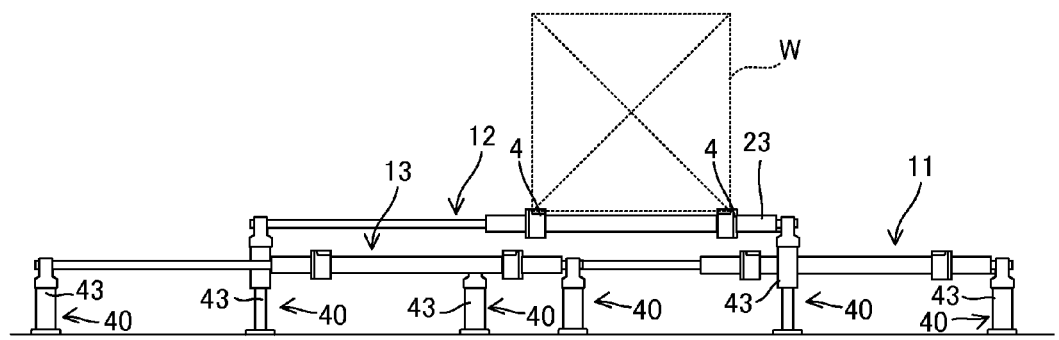
FIG. 5C is a diagram for describing the operation of the conveying apparatus.

As the lift tube 43 of the first cylinder pair 11 is lowered to the stroke end, a hydraulic pressure is supplied to the upper pressure chamber R6 of the lift cylinder 40 of the second cylinder pair 12, and a hydraulic pressure is discharged from the lower pressure chamber R5. As a result, the lift tube 43 is lifted, and the workpiece W placed on the cylinder tube 23 is lifted together (FIG. 5C). In addition, a hydraulic pressure is supplied to the second pressure chamber R2 of the hydraulic cylinder 10 of the first cylinder pair 11, and a hydraulic pressure is discharged from the first pressure chamber R1, so that the cylinder tube 23 of the first cylinder pair 11 is returned to the back side of the conveying direction.

Figure 5D:
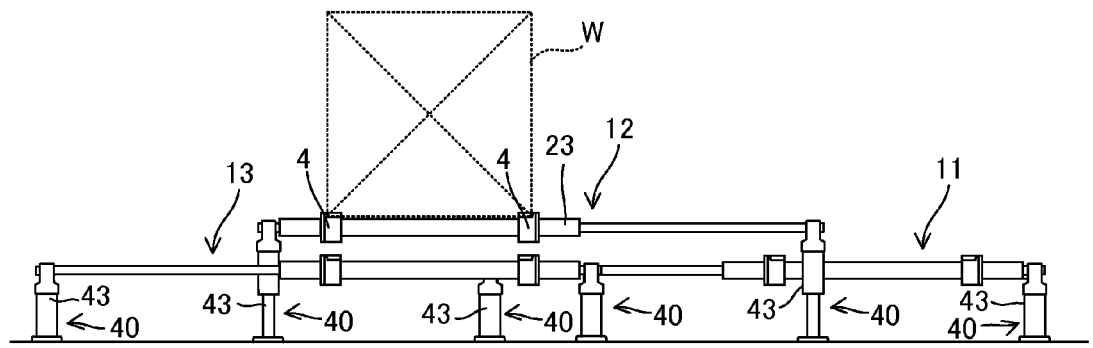
FIG. 5D is a diagram for describing the operation of the conveying apparatus.

Subsequently, if a hydraulic pressure is supplied to the first pressure chamber R1 of the hydraulic cylinder 10 of the second cylinder pair 12, and a hydraulic pressure is discharged from the second pressure chamber R2, the cylinder tube 23 slidingly moves in the conveying direction, and the workpiece W moves in the conveying direction along with the cylinder tube 23 (FIG. 5D).

As the cylinder tube 23 of the hydraulic cylinder 10 of the second cylinder pair 12 slidingly moves to the stroke end, a hydraulic pressure is supplied to the lower pressure chamber R5 of the lift cylinder 40, and a hydraulic pressure is discharged from the upper pressure chamber R6. As a result, the lift tube 43 of the second cylinder pair 12 is lowered, and the workpiece W is placed on the frame 2.

Figure 5E:
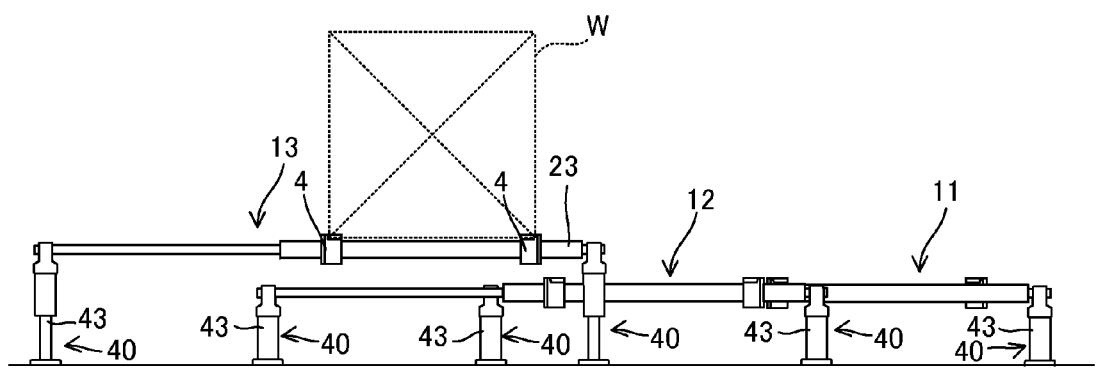
FIG. 5E is a diagram for describing the operation of the conveying apparatus.

As the lift tube 43 of the second cylinder pair 12 is lowered to the stroke end, a hydraulic pressure is supplied to the upper pressure chamber R6 of the lift cylinder 40 of the third cylinder pair 13, and a hydraulic pressure is discharged from the lower pressure chamber R5. As a result, the lift tube 43 is lifted, and the workpiece W placed on the cylinder tube 23 is lifted together (FIG. 5E). In addition, a hydraulic pressure is supplied to the second pressure chamber R2 of the hydraulic cylinder 10 of the second cylinder pair 12, and a hydraulic pressure is discharged from the first pressure chamber R1, so that the cylinder tube 23 of the second cylinder pair 12 is returned to the back side of the conveying direction.

Figure 5F:
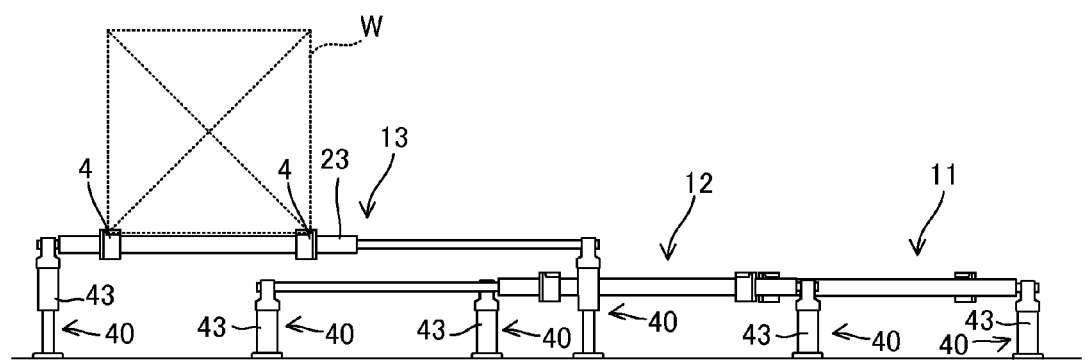
FIG. 5F is a diagram for describing the operation of the conveying apparatus.

Subsequently, if a hydraulic pressure is supplied to the first pressure chamber R1 of the hydraulic cylinder 10 of the third cylinder pair 13, and a hydraulic pressure is discharged from the second pressure chamber R2, the cylinder tube 23 slidingly moves in the conveying direction, and the workpiece W moves in the conveying direction along with the cylinder tube 23 (FIG. 5F).

As the cylinder tube 23 of the hydraulic cylinder 10 of the third cylinder pair 13 slidingly moves to the stroke end, a hydraulic pressure is supplied to the lower pressure chamber R5 of the lift cylinder 40, and a hydraulic pressure is discharged from the upper pressure chamber R6. As a result, the lift tube 43 of the third cylinder pair 13 is lowered, and the workpiece W is placed on the frame 2.

As a result, the conveying apparatus 100 can convey the workpiece W in the conveying direction. It is noted that, although a description of this embodiment has been made by exemplifying a case where the conveying apparatus 100 has three pairs of hydraulic cylinders 10, it is possible to convey the workpiece W through the aforementioned process even when the conveying apparatus 100 has two or four or more pairs of hydraulic cylinders 10.

Figure 6:
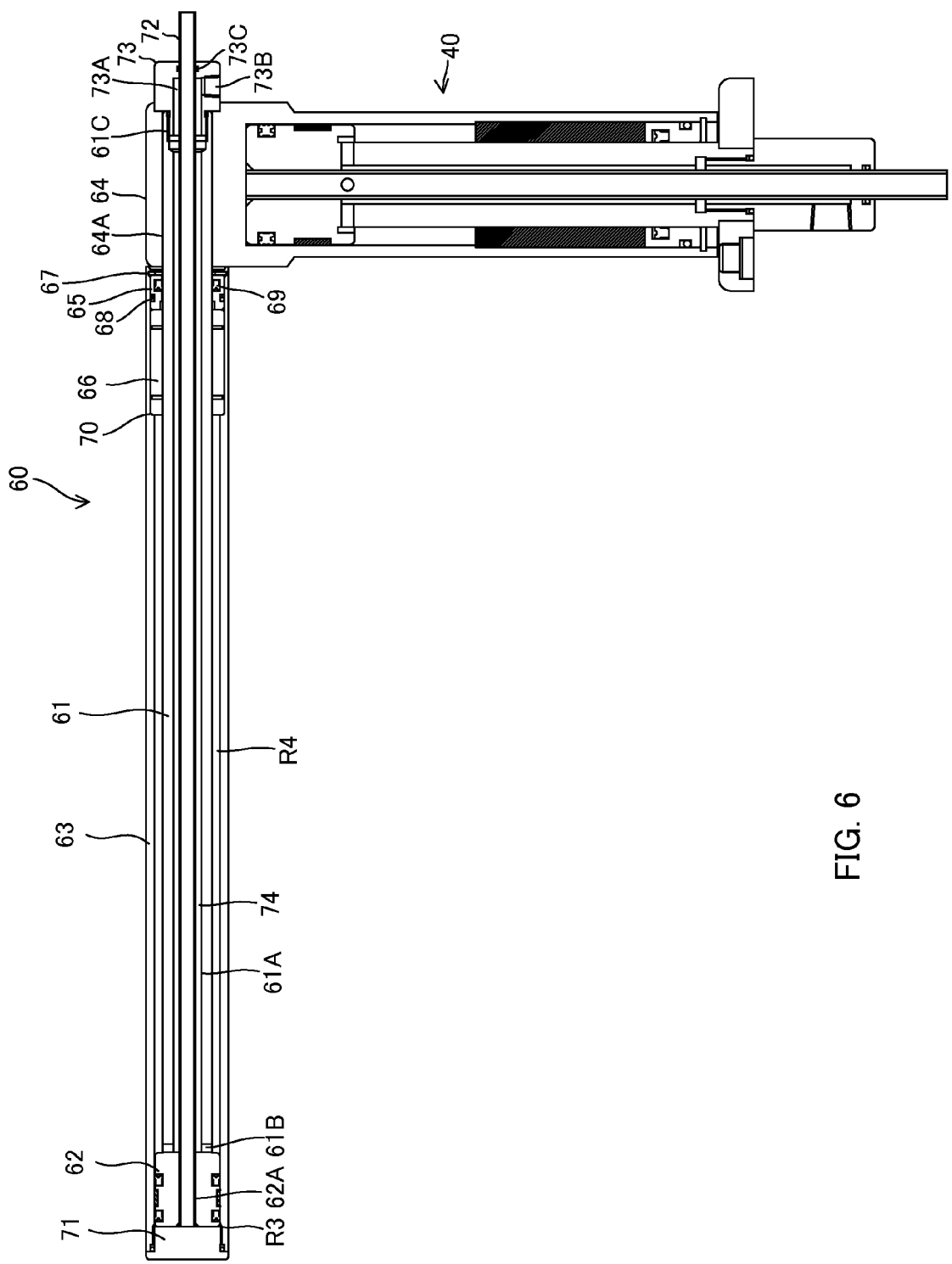
FIG. 6 is a cross-sectional view illustrating a hydraulic cylinder according to a modification of the embodiment of this disclosure.

Next, a hydraulic cylinder 10 according to a modification of the embodiment will be described. FIG. 6 is a cross-sectional view illustrating a hydraulic cylinder 10 according to a modification of the embodiment.

The hydraulic cylinder 60 is a single rod type and includes: piston rods 61 arranged in parallel along the conveyance path; pistons 62 integratedly connected to the piston rods 61; and cylinder tubes 63 that slidably house the pistons 62 and have an internal pressure chamber partitioned by the piston 62 into the third and fourth pressure chambers R3 and R4.

The piston rod 61 is a columnar member fixed in an axial direction with one end being supported by the support portion 64. The piston 62 is a columnar portion having a diameter larger than that of the piston rod 61 and is integratedly connected to the other end of the piston rod 61. The cylinder tube 63 is a cylindrical member provided in an outer circumference of the piston rod 61 to cover the piston rod 61 and has an inner circumference making sliding contact with the outer circumference of the piston 62.

A seal casing 65 and a bushing 66 are fitted to one end of the cylinder tube 63 sequentially in this order from the end side. The seal casing 65 is fixed using a snap ring 67 and has an outer circumference that makes close contact with the inner circumference of the cylinder tube 63 and is sealed with an O-ring 68 and an inner circumference that makes close contact with the outer circumference of the piston rod 61 and is sealed with a rod packing 69. The bushing 66 is held between a step portion 70 formed in the inner circumferential surface of the piston rod 61 and the seal casing 65. A cap 71 is fitted to the other end of the cylinder tube 63.

As a result, a space is defined between the cap 71 of the cylinder tube 63 and the bushing 66, and this space is partitioned by the piston 62 into third and fourth pressure chambers R3 and R4. As described above, the piston 62 is integratedly connected to the piston rod 61, and the piston rod 61 is fixed to the support portion 64. Therefore, the piston 62 and the piston rod 61 do not move, and the cylinder tube 63 slidingly moves in an axial direction depending on a pressure difference between the third and fourth pressure chambers R3 and R4.

The piston rod 61 has a core hole 61A formed to perforate from one end to the other end in an axial direction and a communication hole 61B formed in the other end side of the piston rod 61 in a radial direction to cause internal and external sides of the piston rod 61 to communicate with each other. A thread 61C where a head plug 73 described below is fastened in a screw manner is formed in an inner circumference of an outlet of one end side of the core hole 61A.

A feeding pipe 72 is inserted into the core hole 61A of the piston rod 61. An end portion of the piston 62 side of the feeding pipe 72 is fitted to the core hole 62A of the piston 62, and the feeding pipe 72 extends to the external side of the head plug 73 fastened in a screw manner to one end of the piston rod 61. The outer diameter of the feeding pipe 72 is set to be smaller than the inner diameter of the core hole 61A of the piston rod 61. As a result, an annular passage 74 is formed inside the core hole 61A in the circumferential side outer than the feeding pipe 72.

The support portion 64 arranged in one end of the piston rod 61 to support the piston rod 61 is formed in the head 50 of the single rod type lift cylinder 40. A structure other than the head 50 of the lift cylinder 40 is the same as that of the lift cylinder 40 of FIG. 4, and a description thereof will not be repeated.

The support portion 64 that supports the piston rod 61 is formed over the head 50. The support portion 64 has an insert portion 64A formed in a horizontal direction such that an end portion of the piston rod 61 is inserted. The piston rod 61 is fixed to the support portion 64 in a screw manner using a head plug 73 inserted from the side opposite to the piston rod 61 of the support portion 64 while it is inserted into the insert portion 64A. The head plug 73 is formed in a cylindrical shape having a core hole 73A formed concentrically with the core hole 61A of the piston rod 61. The head plug 73 includes a through-hole 73B perforating through the cylindrical portion in a radial direction and an insert hole 73C that has a diameter smaller than that of the core hole 73A such that the feeding pipe 72 is inserted.

Next, a description will be made for the operation of the hydraulic cylinder 60.

If a hydraulic pressure supplied from the hydraulic pump (not illustrated) is supplied to the third pressure chamber R3 through the feeding pipe 72, and a hydraulic pressure of the fourth pressure chamber R4 is discharged through the communication hole 61B, the annular passage 74, and the through-hole 73B of the head plug 73, the third pressure chamber R3 expands, and the fourth pressure chamber R4 contracts. As a result, the cylinder tube 63 slidingly moves to the third pressure chamber R3 side (to the other end side of the piston rod 61), so that the fourth pressure chamber R4 side of the piston 62 abuts on the bushing 66.

On the contrary, if the hydraulic pressure supplied from the hydraulic pump (not illustrated) is supplied to the fourth pressure chamber R4 through the annular passage 74 and the through-hole 73B of the head plug 73, and the hydraulic pressure of the third pressure chamber R3 is discharged through the feeding pipe 72, the fourth pressure chamber R4 expands, and the third pressure chamber R3 contracts. As a result, the cylinder tube 63 slidingly moves to the fourth pressure chamber R4 side (to one end side of the piston rod 61) so that the third pressure chamber R3 of the piston 62 abuts on the cap 71.

In this manner, it is possible to slidingly move the cylinder tube 63 along the piston rod 61 in an axial direction by feeding/discharging the hydraulic pressure to/from the third and fourth pressure chambers R3 and R4. It is noted that a stroke of the cylinder tube 63 from a state that the cylinder tube 63 stays in the end of the third pressure chamber R3 side to a state that the cylinder tube 63 stays in the end of the fourth pressure chamber R4 side is set to a maximum stroke of the cylinder tube 63.

Here, a description will be made, with reference to FIG. 7A, for a case where the conveyance path of the workpiece W has a curved portion 80 curved perpendicularly, and the workpiece W is conveyed through the curved portion 80.

The conveying apparatus 100 includes: a pedestal 81 arranged in the curved portion 80 of the conveyance path to place the workpiece W; a fourth cylinder pair 14 that conveys the workpiece W to the pedestal 81; and a fifth cylinder pair 15 arranged perpendicularly to the fourth cylinder pair 14 to convey the workpiece W from the pedestal 81. That is, the pedestal 81 is provided in an area where straight conveyance paths intersect with each other, and the fourth and fifth cylinder pairs 14 and 15 are arranged in the vicinity of the pedestal 81.

As a result, it is possible to curve the conveyance path of the workpiece W by arranging the fourth cylinder pair 14 in the end of the conveying apparatus 100 having the straight conveyance path as illustrated in FIG. 1 and delivering the workpiece W to the fifth cylinder pair 15 using the pedestal 81.

A description will now be made for a process of conveying the workpiece W through the curved portion 80 with reference to FIGS. 7A to 7E.

Figure 7A:
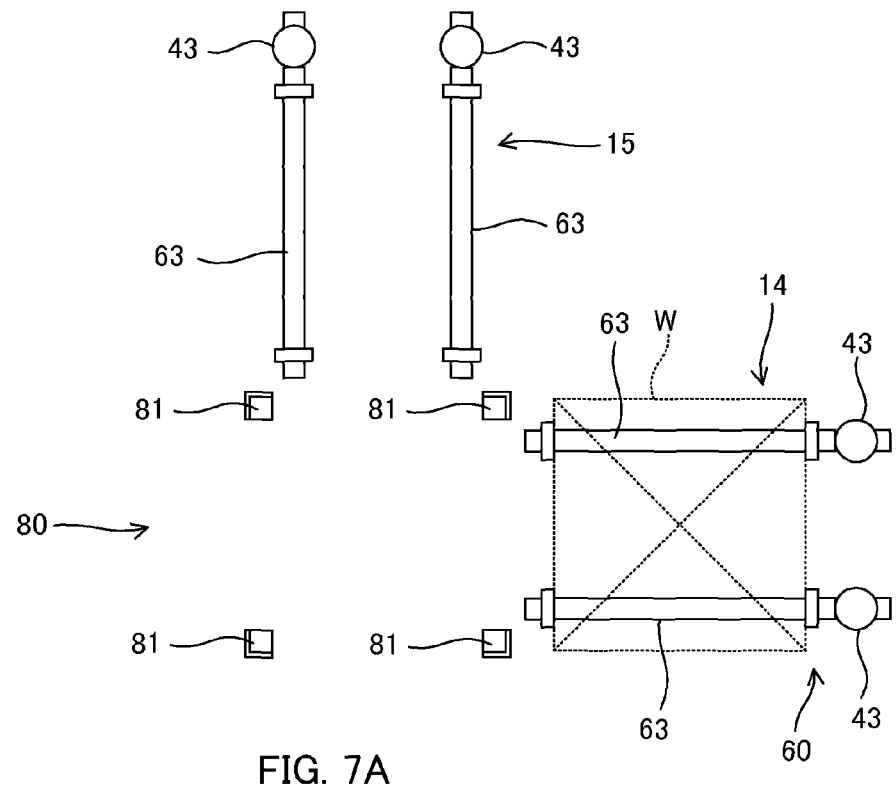
FIG. 7A is a diagram for describing the operation of the conveying apparatus.

As the lift tubes 43 of the fourth cylinder pair 14 are lifted, the workpiece W placed on the cylinder tubes 63 is also lifted together (FIG. 7A). As a result, the hydraulic cylinders 60 of the fourth cylinder pair 14 are held in a position higher than the pedestal 81.

If a hydraulic pressure is supplied to the third pressure chamber R3 of the hydraulic cylinders 60 of the fourth cylinder pair 14, and a hydraulic pressure is discharged from the fourth pressure chamber R4, the cylinder tube 63 slidingly moves in the conveying direction so that the workpiece W moves in the conveying direction along with the cylinder tube 63.

Figure 7B:
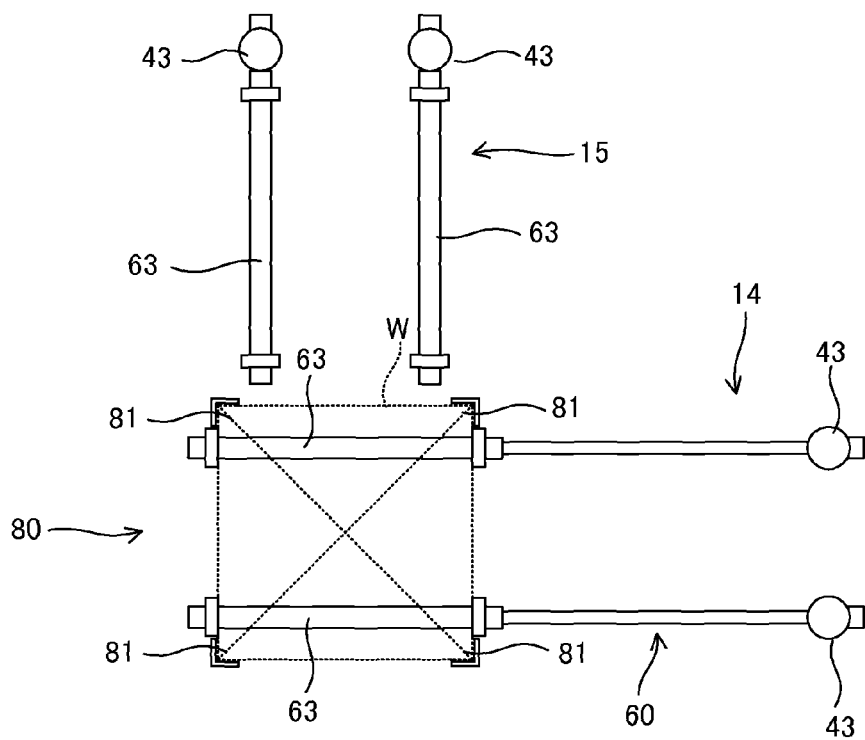
FIG. 7B is a diagram for describing the operation of the conveying apparatus.

As the cylinder tube 63 of the hydraulic cylinders 60 of the fourth cylinder pair 14 slidingly moves to the stroke end, the lift tube 43 is lowered. As a result, the workpiece W is placed on the pedestal 81 (FIG. 7B).

Figure 7C:
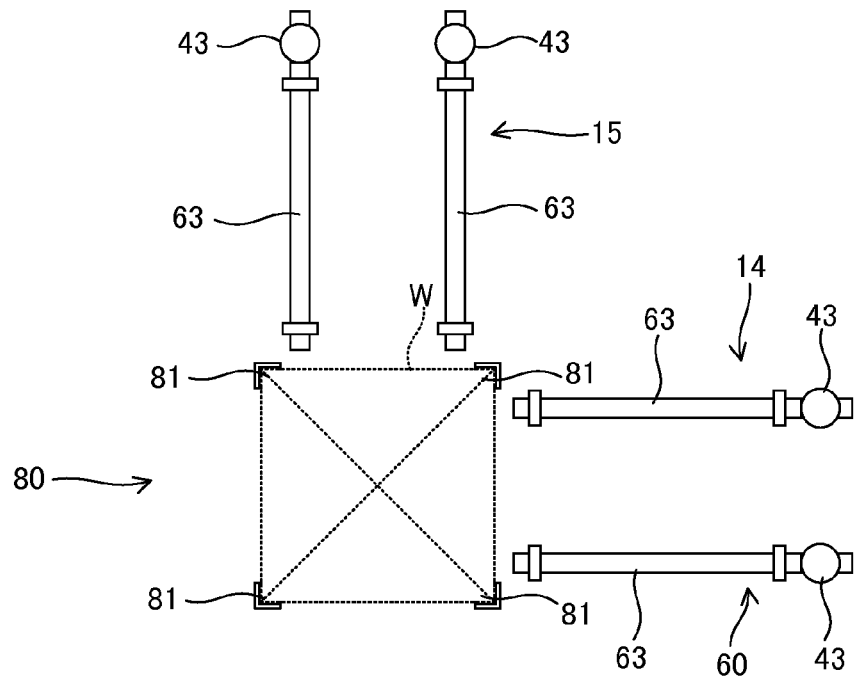
FIG. 7C is a diagram for describing the operation of the conveying apparatus.

As the lift tubes 43 of the fourth cylinder pair 14 are lowered to the stroke end, a hydraulic pressure is supplied to the fourth pressure chamber R4 of the hydraulic cylinders 60 of the fourth cylinder pair 14, and a hydraulic pressure is discharged from the third pressure chamber R3, so that the cylinder tube 63 of the fourth cylinder pair 14 is returned to the back side of the conveying direction (FIG. 7C).

Subsequently, if a hydraulic pressure is supplied to the third pressure chamber R3 of the hydraulic cylinder 60 of the fifth cylinder pair 15, and a hydraulic pressure is discharged from the fourth pressure chamber R4, the cylinder tubes 63 slidingly move to the pedestal 81.

Figure 7D:
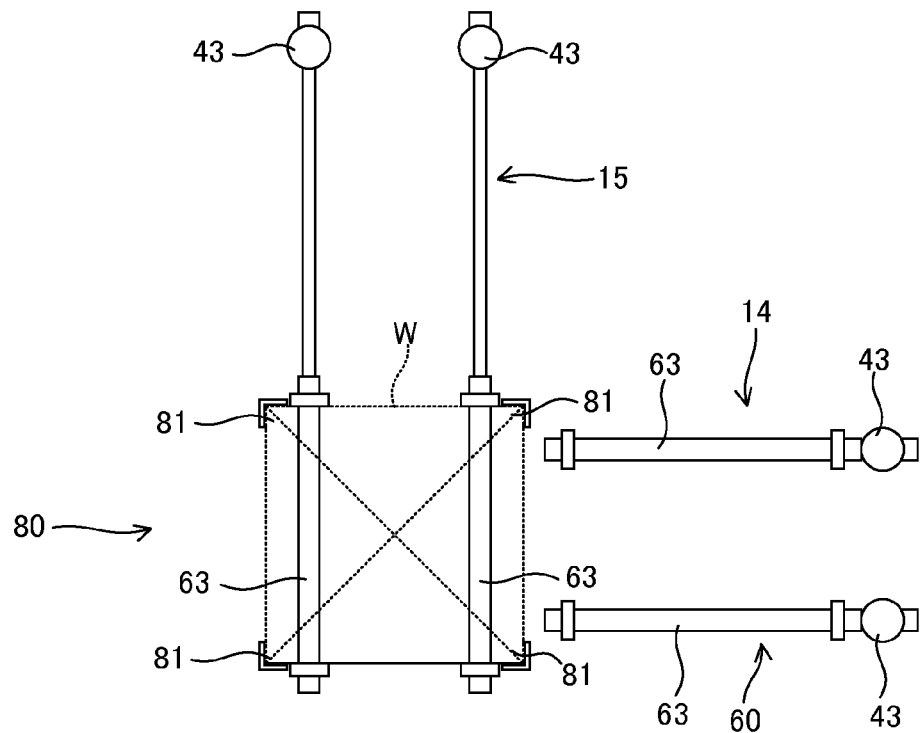
FIG. 7D is a diagram for describing the operation of the conveying apparatus.

As the cylinder tubes 63 of the hydraulic cylinders 60 of the fifth cylinder pair 15 slidingly move to the stroke end, the lift tubes 43 are lifted. As a result, the workpiece W is supported by the cylinder tubes 63 (FIG. 7D).

Figure 7E:
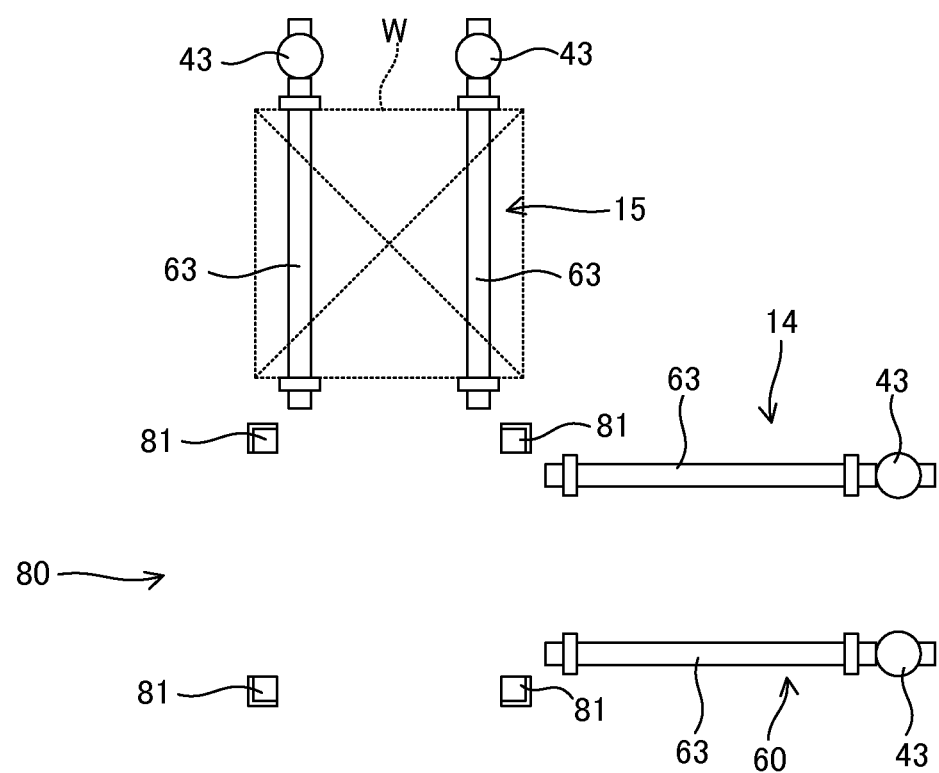
FIG. 7E is a diagram for describing the operation of the conveying apparatus.

As the lift tubes 43 of the fifth cylinder pair 15 are lifted to the stroke end, a hydraulic pressure is supplied to the fourth pressure chamber R4 of the hydraulic cylinders 60 of the fifth cylinder pair 15, and a hydraulic pressure is discharged from the third pressure chamber R3, so that the cylinder tubes 63 of the fifth cylinder pair 15 move to a direction receding from the pedestal 81, that is, in the conveying direction (FIG. 7E).

As described above, it is possible to deliver the workpiece W between the straight conveyance paths perpendicular to each other without interruption by arranging the hydraulic cylinder 60 according to a modification of the embodiment in the end portion of the straight conveyance path of FIG. 1.

According to the embodiment of this disclosure described above, it is possible to obtain the following effects.

Since the workpiece W is conveyed using the hydraulic cylinders 10 and 60 that expand/contract by supplying/discharging a hydraulic pressure, it is possible to suppress leakage of dust such as abrasive debris out of a cylinder, compared to a case where a cylinder using an air pressure or an oil pressure is employed.

Since the workpiece W is conveyed using the cylinder tubes 23 and 63, it is possible to obtain a longer stroke, compared to a case where the workpiece W is conveyed using the piston rod 21.

Since the hydraulic cylinders 10 are double rod type cylinders, both ends are supported by the bushings 27 at all times regardless of a slide distance of the cylinder tube 23. Therefore, it is possible to hold the cylinder tube 23 that supports the workpiece W with high rigidity.

Since the piston rod 21 has the first and second communication holes 21A and 21B, it is possible to slidingly move the cylinder tube 23 without separately providing a pipe that supplies a hydraulic pressure to the first and second pressure chambers R1 and R2 outside the cylinder tube 23.

Since a pair of hydraulic cylinders 10 are arranged continuously in parallel to overlap with each other, it is possible to freely set the length of the conveyance path by adjusting the number of the arranged cylinder pairs.

Since the cylinder pairs 11, 12, and 13 are sequentially lifted in this order, and the cylinder tubes 23 slidingly move, it is possible to reliably convey the workpiece W by preventing interference of the cylinder pairs 11, 12, and 13 with each other during conveyance of the workpiece W.

In a modification of the embodiment of this disclosure, since the hydraulic cylinder 60 is a single rod type, and the pedestal 81 is provided in the curved portion 80, it is possible to deliver the workpiece W without interference of the hydraulic cylinders 60 with each other in the curved portion 80 of the conveyance path where the cylinder pairs 14 and 15 intersect with each other.

In addition, it is possible to connect the straight conveyance paths to each other in a curved shape curved perpendicularly by combining the double rod type hydraulic cylinders 10 and the single rod type hydraulic cylinders 60. Therefore, it is possible to implement the conveyance path with a free shape inside a clean room.

The embodiments of the present invention described above are merely illustration of some application examples of the present invention and not of the nature to limit the technical scope of the present invention to the specific constructions of the above embodiments.

For example, in the embodiment described above, a sensor that detects a horizontal sliding movement position of the cylinder tube 23 and a vertical sliding movement position of the lift tube 43 or the like may be provided. In this case, as illustrated in FIG. 4, a proximity switch 54 is provided to detect whether or not the cylinder tube 23 abuts on the head 50 of the lift cylinder 40, and a proximity switch 56 is provided to detect whether or not the lift tube 43 abuts on a base flange 55 where the lower end of the lift tube 43 abuts.

The proximity switch 54 provided in the head 50 detects whether or not the cylinder tube 23 slidingly moves to the first pressure chamber R1 side end and the second pressure chamber R2 side end. In addition, the proximity switch 56 provided in the base flange 55 detects whether or not the lift tube 43 is positioned in the lower end and upper end.

By supplying/discharging the hydraulic pressure to/from the hydraulic cylinder 10 and the lift cylinder 40 depending on a detection result of the proximity switches 54 and 56, it is possible to synchronize sliding timings between the cylinder tube 23 and the lift tube 43 with high accuracy and reliably convey the workpiece W.

Although a description has been made in the aforementioned embodiment by assuming that the piston 22 is a part of the piston rod 21, the piston 22 and the piston rod 21 may be separate members. Similarly, although a description has been made by assuming that the piston 62 is a part of the piston rod 61, the piston 62 and the piston rod 61 may be separate members.

The present application claims a priority based on Japanese Patent Application No. 2013-166750 filed with the Japan Patent Office on Aug. 9, 2013, all the contents of which are hereby incorporated by reference.

The invention claimed is:

1. A conveying apparatus comprising:
hydraulic cylinders adapted to horizontally convey a workpiece along a conveyance path, wherein:
a pair of the hydraulic cylinders are arranged in parallel with an interval in a width direction of the conveyance path;
the hydraulic cylinders have:
piston rods that extend in parallel along the conveyance path, the piston rods being fixed in an axial direction;
pistons connected to the piston rods; and
cylinder tubes that house the pistons in a slidable manner, the cylinder tubes having an internal pressure chamber partitioned by the pistons into first and second pressure chambers,
the cylinder tubes slidingly move to the first pressure chamber side by supplying a hydraulic pressure to the first pressure chamber and discharging a hydraulic pressure from the second pressure chamber;
the cylinder tubes slidingly move to the second pressure chamber side by supplying a hydraulic pressure to the second pressure chamber and discharging a hydraulic pressure from the first pressure chamber;
the workpiece is supported by a pair of the cylinder tubes,
the pair of hydraulic cylinders are double rod type cylinders in which the ends of each piston rod of the piston rods of the pair of hydraulic cylinders are supported by a support portion, and each piston of the pistons of the pair of hydraulic cylinders is connected to a center of a respective one of the piston rods of the pair of hydraulic cylinders,
each respective piston rod of the piston rods having:
a first communication hole internally bored to communicate from one end of the respective piston rod to the first pressure chamber;
a second communication hole internally bored to communicate from another end of the respective piston rod to the second pressure chamber;
a hydraulic pressure being supplied/discharged to/from the first pressure chamber through the first communication hole,
a hydraulic pressure being supplied/discharged to/from the second pressure chamber through the second communication hole;
the conveying apparatus further comprising:
a first cylinder pair having the pair of hydraulic cylinders, the first cylinder pair being provided along a conveying direction;
a second cylinder pair having the pair of hydraulic cylinders, the second cylinder pair being provided along the conveying direction in a downstream side from the first cylinder pair, the second cylinder pair overlapping with the first cylinder pair; and
a lift mechanism configured to vertically lift or lower the support portion as hydraulic pressure is supplied/discharged,
the workpiece is conveyed to a downstream side of the conveying direction as a support portion of the first cylinder pair is lifted and a cylinder tube of the cylinder tubes, which is part of the first cylinder pair, slidingly moves to the first pressure chamber side,
the workpiece is delivered from the first cylinder pair to the second cylinder pair as the support portion of the first cylinder pair is lowered and a support portion of the second cylinder pair is lifted, and
the workpiece is conveyed to a downstream side of the conveying direction as the support portion of the second cylinder pair is lifted, and a cylinder tube of the cylinder tubes, which is part of the second cylinder pair, slidingly moves to the first pressure chamber side.

2. A conveying apparatus comprising:
hydraulic cylinders adapted to horizontally convey a workpiece along a conveyance path, wherein:
a pair of the hydraulic cylinders are arranged in parallel with an interval in a width direction of the conveyance path;
the hydraulic cylinders have:
piston rods that extend in parallel along the conveyance path, the piston rods being fixed in an axial direction;
pistons connected to the piston rods; and
cylinder tubes that house the pistons in a slidable manner, the cylinder tubes having an internal pressure chamber partitioned by the pistons into first and second pressure chambers,
the cylinder tubes slidingly move to the first pressure chamber side by supplying a hydraulic pressure to the first pressure chamber and discharging a hydraulic pressure from the second pressure chamber;
the cylinder tubes slidingly move to the second pressure chamber side by supplying a hydraulic pressure to the second pressure chamber and discharging a hydraulic pressure from the first pressure chamber;
the workpiece is supported by a pair of the cylinder tubes,
the pair of hydraulic cylinders are single rod type cylinders in which each piston rod of the piston rods of the pair of hydraulic cylinders has only one end supported by a support portion, and each piston of the pistons of the pair of hydraulic cylinders is connected to another end of a respective one the piston rods of the of the pair of hydraulic cylinders;
each respective piston rod of the piston rods has:
a first communication hole internally bored to communicate from one end of the respective piston rod to the first pressure chamber; and a second communication hole internally bored in an annular shape in an outer circumference side of the first communication hole to communicate from one end of the respective piston rod to the second pressure chamber;

a hydraulic pressure being supplied/discharged to/from the first pressure chamber through the first communication hole; and a hydraulic pressure being supplied/discharged to/from the second pressure chamber through the second communication hole.

3. The conveying apparatus according to claim 2, further comprising:

a first cylinder pair having the pair of hydraulic cylinders, the first cylinder pair being provided along a conveying direction;

a second cylinder pair having the pair of hydraulic cylinders, the second cylinder pair being provided along the conveying direction in a downstream side from the first cylinder pair, the second cylinder pair overlapping with the first cylinder pair; and a lift mechanism configured to vertically lift or lower the support portion as hydraulic pressure is supplied/discharged, wherein:

the workpiece is conveyed to a downstream side of the conveying direction as a support portion of the first cylinder pair is lifted and a cylinder tube of the cylinder tubes, which is part of the first cylinder pair, slidingly moves to the first pressure chamber side;

the workpiece is delivered from the first cylinder pair to the second cylinder pair as the support portion of the first cylinder pair is lowered and a support portion of the second cylinder pair is lifted; and the workpiece is conveyed to a downstream side of the conveying direction as the support portion of the second cylinder pair is lifted, and a cylinder tube of the cylinder tubes, which is a part of the second cylinder pair, slidingly moves to the first pressure chamber side.

4. The conveying apparatus according to claim 1, further comprising:

a horizontal position detector configured to detect whether or not the cylinder tubes slidingly move to a side end of the first pressure chamber and whether or not the cylinder tubes slidingly move to a side end of the second pressure chamber; and a vertical position detector configured to detect whether or not the support portion which is configured to be lifted by the lift mechanism slidingly moves to a lower end and whether or not the support portion which is configured to be lifted by the lift mechanism slidingly moves to an upper end, wherein the cylinder tubes slidingly moves and the support portion which is configured to be lifted by the lift mechanism vertically moves based on a result of detection of the horizontal position detector and the vertical position detector.

5. The conveying apparatus according to claim 2, further comprising:

a pedestal provided in a curved portion curved perpendicularly in the conveyance path to place the workpiece;

a fourth cylinder pair having the pair of hydraulic cylinders, the fourth cylinder pair arranged in a vicinity of the curved portion;

a fifth cylinder pair having the pair of hydraulic cylinders, the fifth cylinder pair being arranged in a vicinity of the curved portion perpendicularly to the fourth cylinder pair; and a lift mechanism configured to vertically lift or lower the support portion by supplying/discharging hydraulic pressure, wherein:

the workpiece is placed on the pedestal by lifting a support portion of the fourth cylinder pair, slidingly moving a cylinder tube of the cylinder tubes, which is a part of the fourth cylinder pair, to the first pressure chamber side, and lowering the support portion of the fourth cylinder pair;

the workpiece is delivered from the fourth cylinder pair to the fifth cylinder pair by lowering the support portion of the fourth cylinder pair, slidingly moving a cylinder tube of the cylinder tubes, which is a part of the fifth cylinder pair, to the first pressure chamber side, and lifting a support portion of the fifth cylinder pair; and the workpiece is conveyed to a downstream side of the conveying direction by lifting the support portion of the fifth cylinder pair, and slidingly moving the cylinder tube of the fifth cylinder pair to the second pressure chamber side.

6. A conveying apparatus comprising:

pairs of hydraulic cylinders adapted to horizontally convey a workpiece along a conveyance path and being disposed such that for each of the pairs of the hydraulic cylinders, the respective hydraulic cylinders being arranged in parallel with each other along the conveyance path, each of the hydraulic cylinders being a single rod type cylinder and having:

a piston rod that extends along the conveyance path, the piston rod being fixed in an axial direction and having one end being supported by a support portion;

a piston connected to another end of the piston rod; and a cylinder tube for supporting the workpiece and that houses the piston in a slidable manner, the cylinder tube having an internal pressure chamber partitioned by the piston into first and second pressure chambers, the cylinder tubes being configured to slidingly move to the first pressure chamber side by supplying a hydraulic pressure to the first pressure chamber and discharging a hydraulic pressure from the second pressure chamber, the cylinder tube being configured to slidingly move to the second pressure chamber side by supplying a hydraulic pressure to the second pressure chamber and discharging a hydraulic pressure from the first pressure chamber, wherein the piston rod has a first communication hole internally bored to communicate from the one end of the piston rod to the first pressure chamber, and a second communication hole internally bored in an annular shape in an outer circumference side of the first communication hole to communicate from the one end of the piston rod to the second pressure chamber, wherein a hydraulic pressure is supplied/discharged to/from the first pressure chamber through the first communication hole, and further wherein a hydraulic pressure is supplied/discharged to/from the second pressure chamber through the second communication hole.

* * * * *